(12) United States Patent
Pritchett et al.

(10) Patent No.: US 7,889,649 B2
(45) Date of Patent: Feb. 15, 2011

(54) METHOD AND SYSTEM FOR GATEWAY COMMUNICATION

(75) Inventors: Dan L Pritchett, San Jose, CA (US); Connie Y. Yang, Saratoga, CA (US); Randall Scott Shoup, San Francisco, CA (US); Alok Bhanot, Hillsborough, CA (US)

(73) Assignee: eBay Inc., San Jose, CA (US)

( * ) Notice: Subject to any disclaimer, the term of this patent is extended or adjusted under 35 U.S.C. 154(b) by 535 days.

(21) Appl. No.: 11/646,800

(22) Filed: Dec. 28, 2006

(65) Prior Publication Data

US 2008/0159134 A1 Jul. 3, 2008

(51) Int. Cl.
*H01R 31/08* (2006.01)
(52) U.S. Cl. ...................................... 370/230
(58) Field of Classification Search .......... 370/229–240
See application file for complete search history.

(56) References Cited

U.S. PATENT DOCUMENTS

| | | | |
|---|---|---|---|
| 6,968,389 B1 * | 11/2005 | Menditto et al. | 709/233 |
| 2004/0218611 A1 * | 11/2004 | Kim | 370/401 |
| 2004/0258239 A1 | 12/2004 | Gallant et al. | |
| 2005/0013312 A1 * | 1/2005 | Karlsen et al. | 370/412 |
| 2007/0147398 A1 * | 6/2007 | Upp et al. | 370/401 |
| 2007/0179778 A1 * | 8/2007 | Gong et al. | 704/9 |
| 2008/0132241 A1 * | 6/2008 | Hancock et al. | 455/450 |
| 2009/0097402 A1 * | 4/2009 | Stumpert et al. | 370/230.1 |

FOREIGN PATENT DOCUMENTS

| | | |
|---|---|---|
| EP | 0817444 A2 | 1/1998 |
| WO | WO-2008088496 A2 | 7/2008 |
| WO | WO-2008088496 A3 | 7/2008 |

OTHER PUBLICATIONS

International Application Serial No. PCT/US2007/024971, Search Report mailed Jul. 3, 2008, 7pgs.
International Application Serial No. PCT/US2007/024971, Written Opinion mailed Jul. 3, 2008, 9pgs.

* cited by examiner

*Primary Examiner*—Kwang B Yao
*Assistant Examiner*—Tung Q Tran
(74) *Attorney, Agent, or Firm*—Schwegman, Lundberg & Woessner, P.A.

(57) ABSTRACT

Embodiments of a method and system for gateway communication are disclosed. A rate evaluator may be configured to receive a call packet. A quality of service (QOS) specification regarding routing of a local request may be generated for an application according to a business policy. The QOS specification may be available for receipt. A first service gateway may be in communication with the rate evaluator and located in a data center. The first service gateway may be configured to receive the local request from a client machine located in the data center and generate and provide the call packet for the local request to the rate evaluator. The first service gateway may be further configured to receive the QOS specification from the rate evaluator, and route the local request according to the QOS specification to a second service gateway not in the data center.

14 Claims, 17 Drawing Sheets

METHOD AND SYSTEM FOR GATEWAY COMMUNICATION

TECHNICAL FIELD

The present application relates generally to the field of data processing and, in one specific example, to a method and system for gateway communication.

BACKGROUND

A user seeking to use a service provided by an application connect over networks to access the application. Ordinarily, the user connects directly over the network to an application server running the application, regardless of a geographic location of the application server. After authorization, the user may then send requests to and receive responses to the requests from the application server.

BRIEF DESCRIPTION OF THE DRAWINGS

Some embodiments are illustrated by way of example and not limitation in the figures of the accompanying drawings in which.

DETAILED DESCRIPTION

Figure 1:
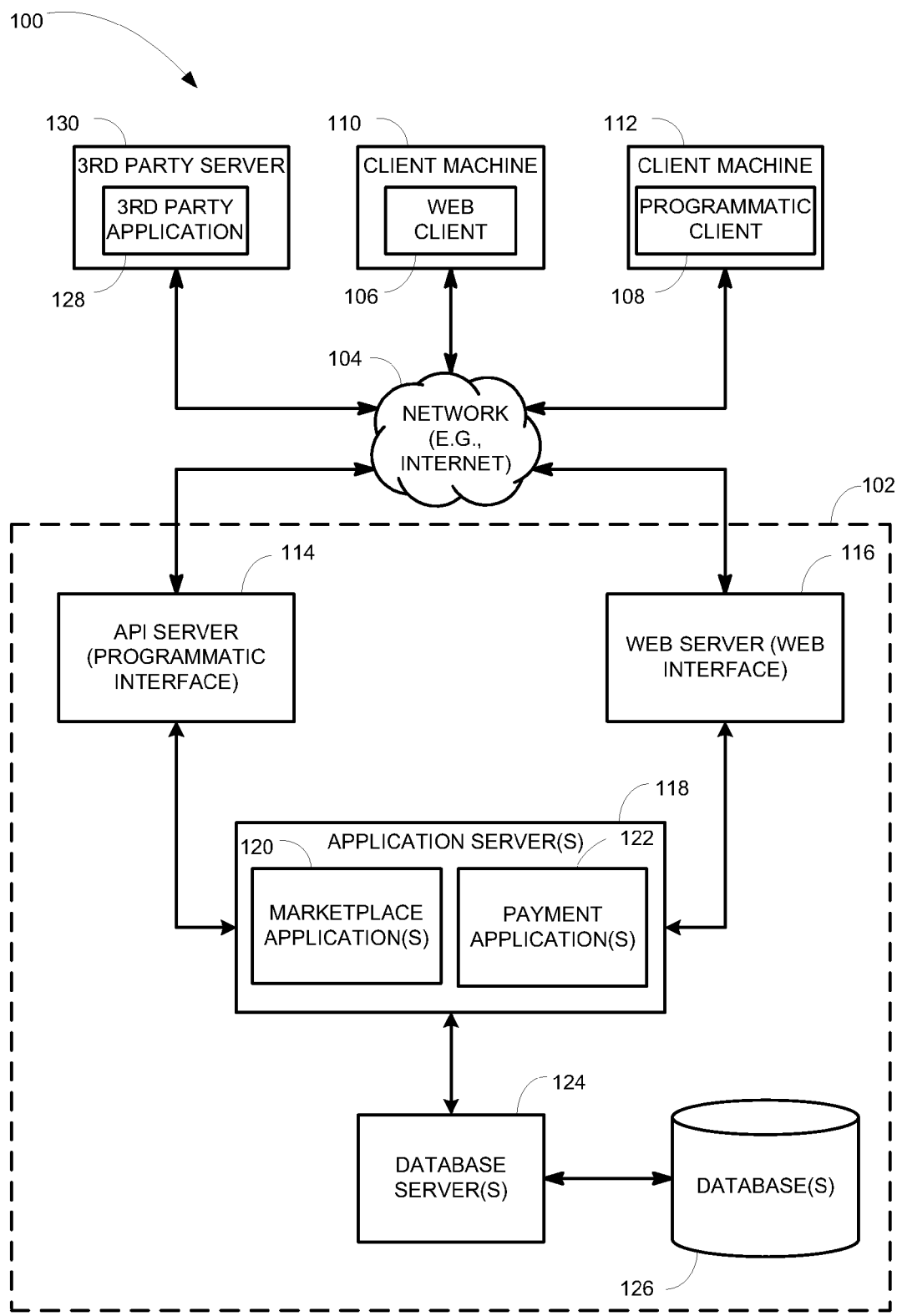
FIG. 1 is a network diagram depicting a network system, according to one embodiment, having a client server architecture configured for exchanging data over a network.

Example methods and systems for gateway communication is described. In the following description, for purposes of explanation, numerous specific details are set forth in order to provide a thorough understanding of example embodiments. It will be evident, however, to one skilled in the art that the present invention may be practiced without these specific details.

In an example embodiment, a rate evaluator may be configured to receive a call packet. A quality of service (QOS) specification regarding routing of a local request may be generated for an application according to a business policy. The QOS specification may be available for receipt. A first service gateway may be in communication with the rate evaluator and located in a data center. The first service gateway may be configured to receive the local request from a client machine located in the data center, generate and provide the call packet for the local request to the rate evaluator. The first service gateway may be further configured to receive the QOS specification from the rate evaluator and route the local request according to the QOS specification to a second service gateway not in the data center.

In an example embodiment, a peer communications component may manage communication of a first service gateway with a plurality of other service gateways. The plurality of other service gateways may respectively be in communication with a plurality of service servers. A routing component may make a routing decision of a request for an application received on the first service gateway to a service server selected from among the plurality of service servers through a second service gateway selected from among the plurality of other service gateways. The route component may also route the request according to the routing decision from the first service gateway to the second service gateway. The second gateway may be in communication with the service server. The service server may provide the application.

In an example embodiment, a request may be accessed for an application on a first service gateway. A location of a service server may be determined for providing the application. A connection to a second service gateway in communication with the service server may be accessed. The second service gateway may not in a same data center as the first service gateway. A determination may be made as to whether the request is in alignment with a quality of service (QOS) specification associated with the first service gateway. An action may be performed with the request in accordance with the QOS specification.

In an example embodiment, a data heartbeat may be received during a time period from at least service gateway of a plurality of gateways in a data center. The plurality of gateways may be identified on a data center list. The data heartbeat may provide notification that a particular service gateway among the plurality of service gateways is available on a network. A selected service gateway may be removed from among the plurality of service gateways identified on the data center list when the data heartbeat is not received from the selected service gateway during the time period.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
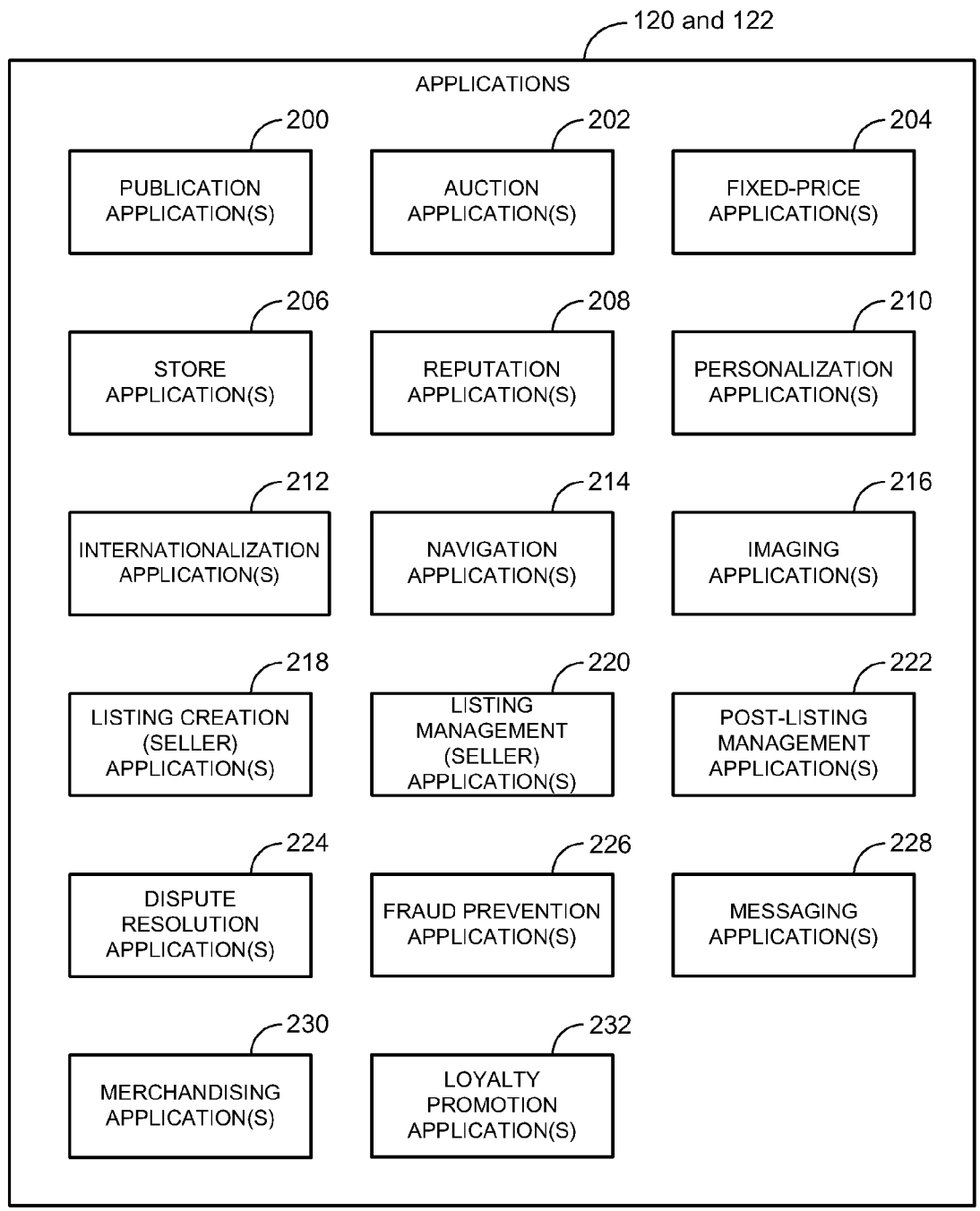
FIG. 2 is a block diagram illustrating an example embodiment of multiple network and marketplace applications, which are provided as part of the network-based marketplace.

FIG. 2 is a block diagram illustrating multiple applications 120 and 122 that, in one example embodiment, are provided as part of the networked system 102 (see FIG. 1). The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized and/or localized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or system inventory structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Figure 3:
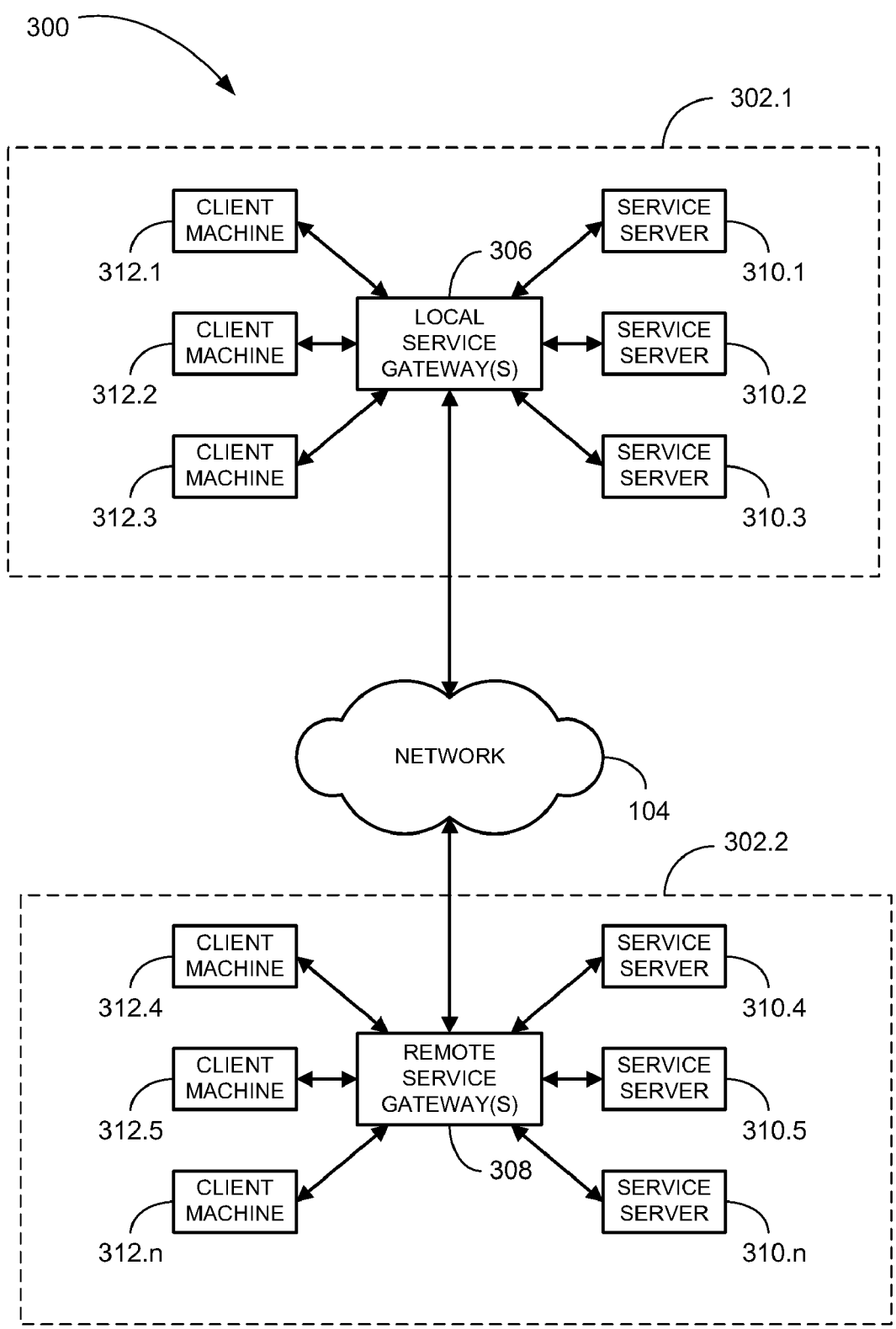
FIG. 3 is a network diagram depicting a gateway communication system according to an example embodiment.

Referring to FIG. 3, a gateway communication system 300 according to an example embodiment is illustrated. The gateway communication system 300 may include a local data center 302.1 (e.g., a first data center) connected to a remote data center 302.2 (e.g. a second data center) over the network 104 (see FIG. 1). A data center 302 may be a location with network connectivity that includes a logical network boundary that segregates inside traffic (e.g., local requests) from outside traffic (e.g., remote requests). For example, a plurality of data centers 302 of the gateway communication system 300 may be located in different geographic areas, distinguished by function, or otherwise separated.

The local data center 302.1 may communicate with the remote data center 302.2 through the use of one or more local service gateways 306 and one or more remote service gateways 308 respectively. The service gateways 306, 308 may operate on one or more computing systems to route traffic (e.g., in the form of requests and responses to requests) and may optionally be operated in a distributed environment.

The data center 302.1 may include the one or more local service gateways 306 in communication with a number of service servers 310.1-310.3 and a number of client machines 312.1-312.3. The second data center 302.2 may include the one or more remote service gateways 308 in communication with a number of service servers 310.4-310.$n$ and a number of client machines 312.4-312.$n$.

The service servers 310.1-310.$n$ may include the functionality of the third party servers 130 and/or the application servers 118 (see FIG. 1). For example, the services servers 310.1-310.3 may provide a first set of functionality from within the data center 302.1 and the service servers 310.4-310.$n$ may provide a second set of functionality from within the data center 302.2. Each service server 310 may provide one or more applications (e.g., a marketplace application 120, a payment application 122, and/or a third party application 128).

The client machines 312.1-312.$n$ may include the functionality of the client machine 110 and/or the client machine 112 (see FIG. 1). As described in greater detail below, the client machines 312.1-312.3 located in the local data center 302.1 may communicate with an application (e.g., a service) provided by the service server 310 in the local data center 302.1 and/or the remote data center 302.2 through the local service gateway 306.

The interconnection of a plurality of service gateways 306, 308 and their respective connection with service servers 310 may form a mesh over which requests may be made and responses to the requests may be received. By utilizing the mesh for communications and maintaining the interconnection, a connection setup between for the client machine 312 may take place with the local service gateway 306 even when the service server 310 is located in the remote data center 302.2. In an example embodiment, the use of the mesh may reduce connection time (e.g., latency time) on connecting to an application.

In an example embodiment, a plurality of service gateways 306, 308 may be strategically placed in geographic areas to reduce latency. Each service gateway 306, 308 may connect to all or a subset of gateways 306, 308 available in other data centers 302.

Figure 4:
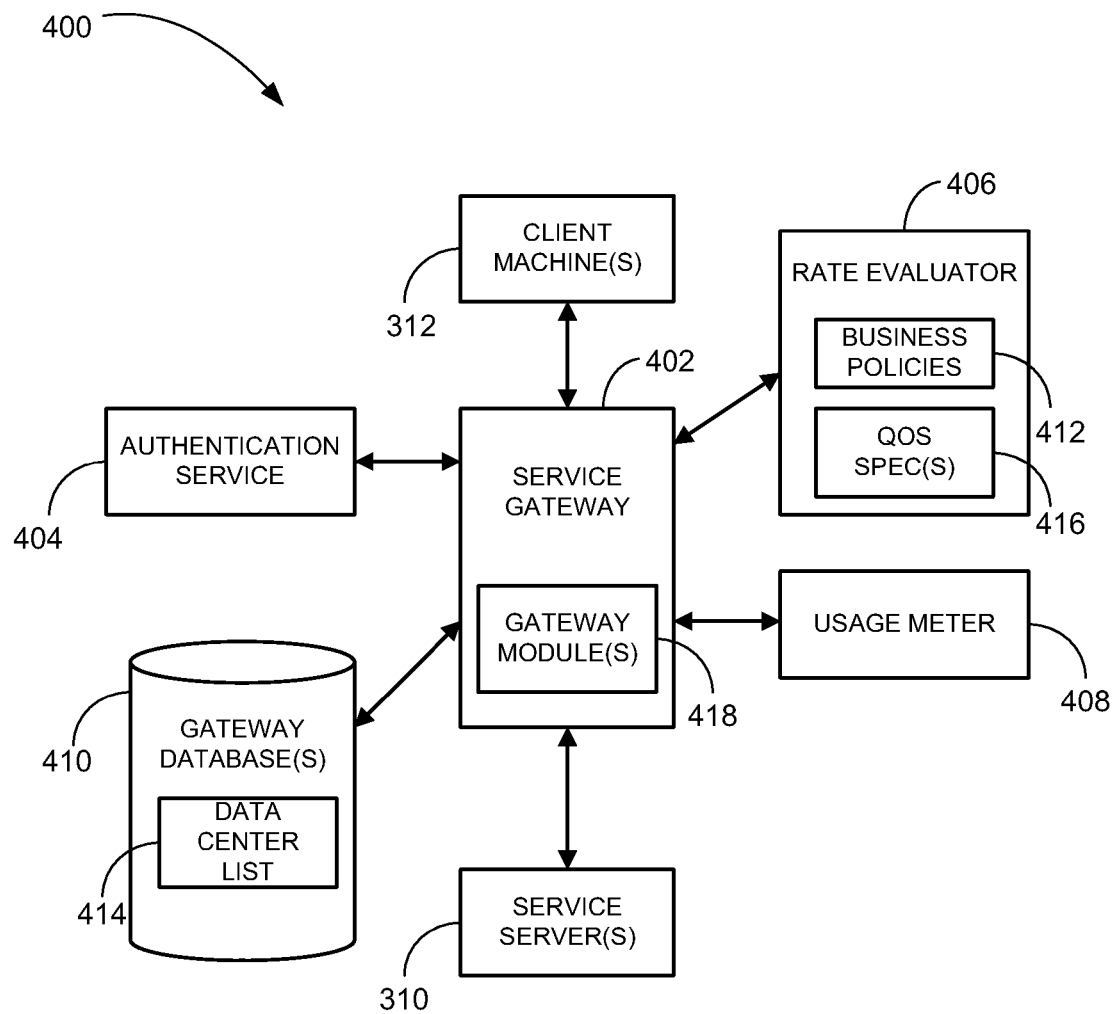
FIG. 4 is an example data center.

Referring to FIG. 4, a data center 400 according to an example embodiment is illustrated. In an example embodiment, the local data center 302.1 and/or the remote data center 302.2 (see FIG. 3) may include the functionality of the data center 400.

A service gateway 402 may be in communication with one or more client machines 312 and one or more service servers 310 (see FIG. 3). In an example embodiment, the local service gateways 306 and/or the remote service gateways 308 may include the functionality of the service gateway 402.

The service gateway 402 may be in communication with an authentication service 404, a rate evaluator 406, usage meter 408, and one or more gateway databases 410.

The authentication service 404 may authenticate a client machine 312 communicating through the service gateway 402 (e.g., prior to routing the request). For example, the authentication service 404 may provide encryption and/or verification for communication between the client machine 312 and a service server 310, and may translate a client-provided credential from the client machine 312 into an appropriate credential for the service server 310. An authentication token and/or an assertion may be provided by the authentication service 404 to the service server 310 on behalf of the client machine 312 for authentication.

The rate evaluator 406 may evaluate a request received from the client machine 312 via the service gateway 402 and advise the service gateway 402 regarding the handling of the request according to one or more business policies 412. For example, the business policies 412 may limit a number of requests (e.g., of a certain type or a certain number) from a customer (e.g., a user operating the client machine 312) based on contractual agreement, maintaining service capabilities in certain data centers 400, and the like. The business policies 412 may come from a database, a configuration, and/or may be an application of business logic. Other business policies 412 may also be used with the rate evaluator 406.

The rate evaluator 406 may generate a quality of service (QOS) specifications 416 from applying the business policies 412 to received requests and provide (e.g., asynchronously) the QOS specifications 416 to the service gateway 402. An example embodiment of the QOS specification 416 is described in greater detail below.

By way of an example, the rate evaluator 406 may be used to advise the service gateway 402 to handle a number of requests at a first rate and then to handle a number of additional requests at a second rate according to the business policy 412.

In an example embodiment the rate evaluator 406 may be configured to receive a call packet from the service gateway 402, generate a quality of service (QOS) specification 416 regarding routing of a local request according to the business policy 412, and make the QOS specification available for receipt by the service gateway 402. The service gateway 402 may be in communication with the rate evaluator 406 and located in the data center 400 and configured to receive the local request from the client machine 312 located in the data center 400, generate and provide the call packet for the local request to the rate evaluator 406, receive the QOS specification 416 from the rate evaluator 406, and route the local request according to the QOS specification 416 to a second service gateway 402 not in the data center 400.

The usage meter 408 monitors and optionally records information regarding a request routed through the service gateway 402. For example, information regarding who made the request, how long the request took, the payload size of the request, and the like may be generated by the usage meter 408 and optionally recorded (e.g., in a database) for purposes including billing and/or reporting. In an example embodiment, the rate evaluator 406 and/or the usage meter 408 may be implemented through a listener.

The gateway database 410 may include a data center list 414. The data center list 414 may a listing (e.g., an in-memory database) of the service gateways 402 that are available through the network 104 (see FIG. 3). The data center list 414 may include a local data center list 414 (e.g., identifying the local service gateways 306) and a remote data center list 414 (e.g., identifying the remote service gateways 308). The data center list 414 may also include a status of identified service gateways 402. The use of the data center list 414 in maintaining communication between the service gateways 402 of the network 104 is described in greater detail below.

The service gateway 402 may include one or more gateway modules 418. An example embodiment of the gateway module 418 is described in greater detail below.

In an example embodiment, requests and responses to requests may include various types of traffic such as data packets, reliable streams, best effort streams, and the like. Other types of traffic may also be used.

Figure 5:
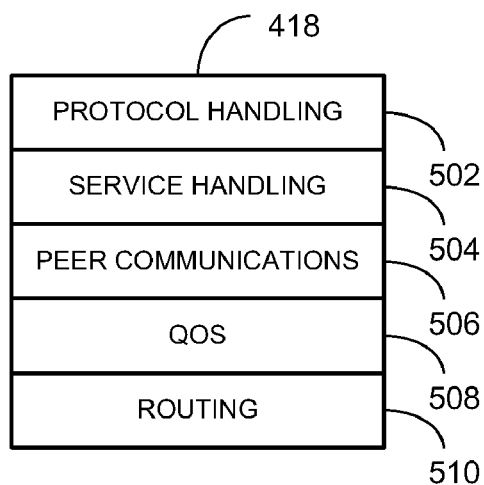
FIG. 5 is an example gateway module.

Referring to FIG. 5, a gateway module 418 (see FIG. 4) according to an example embodiment is illustrated. The gateway module 418 may include a protocol handling component 502, a service handling component 504, a peer communications component 506, a quality of service (QOS) component 508, and/or a routing component 510.

The protocol handling component 502 enables the service gateway 402 (see FIG. 4) ability to support multiple communication protocols (e.g., for networking semantics and/or actual syntax of a protocol). The service handling component 504 calls an application on the service server 310 with a received request and receives the results of the request from the application.

The peer communications component 506 manages communication among a plurality of service gateways 402 by, for example, determining existence of other service gateways 402 and routing traffic to the other service gateways 402. In an example embodiment, peer to peer communications among the service gateways 402 using the peer communications component 506 may be leveraged to improve long distance efficiencies.

The QOS component 508 reads, writes and applies the QOS specifications 416 to requests received from client machines 312. For example, the QOS component 508 may receive a QOS specification 416 for the first service gateway (e.g., from the rate evaluator 406) and provide the QOS specification 416 to the routing component 510 for consideration during a routing decision of the request.

The routing component 510 makes routing decisions such as to which of the service servers 310 a request received from the client machine 312 will be sent and subsequently routes the request. A routing decision by the routing component 510 may include a physical location where the request will be sent and a specific service handler of the service server 310 that will receive the request within the physical location.

In an example embodiment, the routing component 510 may be in communication with the peer communications component 506 to route a request to a remote data center 302.2 if a service is not available within the local data center 302.1. The routing component 510 may optionally be in communication with the peer communications component 506 and the QOS component 508 to enforce the QOS specifications 416.

Figure 6:
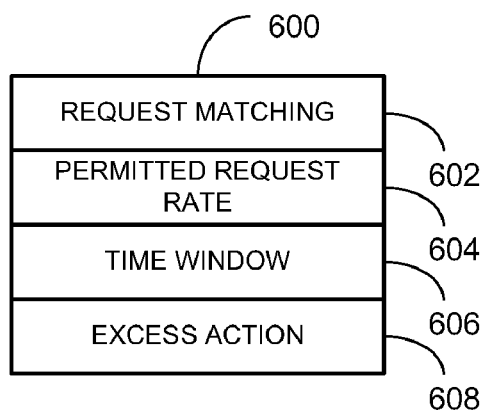
FIG. 6 is an example quality of service (QOS) specification data structure.

Referring to FIG. 6, a quality of service (QOS) specification data structure 600 according to an example embodiment is illustrated. In an example embodiment, the QOS specifications 416 (see FIG. 4) may include one or a plurality of QOS specification data structures 600.

The QOS specification data structure 600 may include a request matching field 602, a permitted request rate field 604, a time window field 606, and/or an excess action field 608.

The request matching field 602 provides (e.g., by retaining) an identification of which requests are subject to the QOS specification data structure 600. The request matching field 602 may identify one or more users (e.g., by a user id) and/or one or more services (e.g., by an application id) that are subject to a particular QOS specification data structure 600. By way of example, the request matching field 602 may be used to identify a user independent of the services accessed by the user, the request matching field 602 may be used to identify a service independent of the users that access the service, or the request matching field 602 may be used to identify use of a service by a user.

By way of example, the request matching field 602 may be used to identify a first set of users that may access the service at a first speed and a second set of users that may access the same service at a second speed, where the QOS specification data structure 600 is used to limit the speed of one of the sets of users.

The permitted request rate field 604 provides (e.g., by retaining) a particular rate at which at which an application may be accessed (e.g., by a user or a set of users).

The time window field 606 provides (e.g., by retaining) a time during which the QOS specification data structure 600 should be used by the service gateway 402. The time window field 606 may include an end time and an optional begin time. For example, the begin time may be used to throttle traffic according to the QOS specification data structure 600 during a peak period.

The excess action field 608 provides (e.g., by retaining) an action to be taken by the service gateway 402 when a request that matches the identification of the request matching field 602 exceeds the particular rate retained in the permitted request rate field 604 during the time retained in the time window field 606. For example, the action may include processing the request, rejecting the request, delaying routing of the request, or sending the request to another service gateway 402.

In an example embodiment, the QOS specification data structure 600 may be used to maintain the service gateway 402 and a certain data rate to prevent overloading (e.g., pursuant to the request matching field 602 and the permitted request rate field 604) and forward excess capacity (e.g., pursuant to the excess action field 608) to another service gateway 402 in another data center 302.

Figure 7:
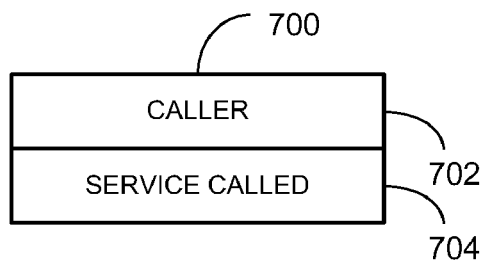
FIG. 7 is an example call packet.

Referring to FIG. 7, an example call packet 700 is illustrated. In an example embodiment, the call packet 700 may be created by the service gateway 402 (see FIG. 4).

The call packet 700 may include a caller field 702 and a service called field 704. The caller field 702 provides (e.g., by retaining) an identification of the client machine 312 (e.g., client identification) making a request and the service called field 704 provides (e.g., by retaining) an identification of an application (e.g., an application identification) being called (e.g., as may be available on the service server 310). The use of the call packet 700 is described in greater detail below.

Figure 8:
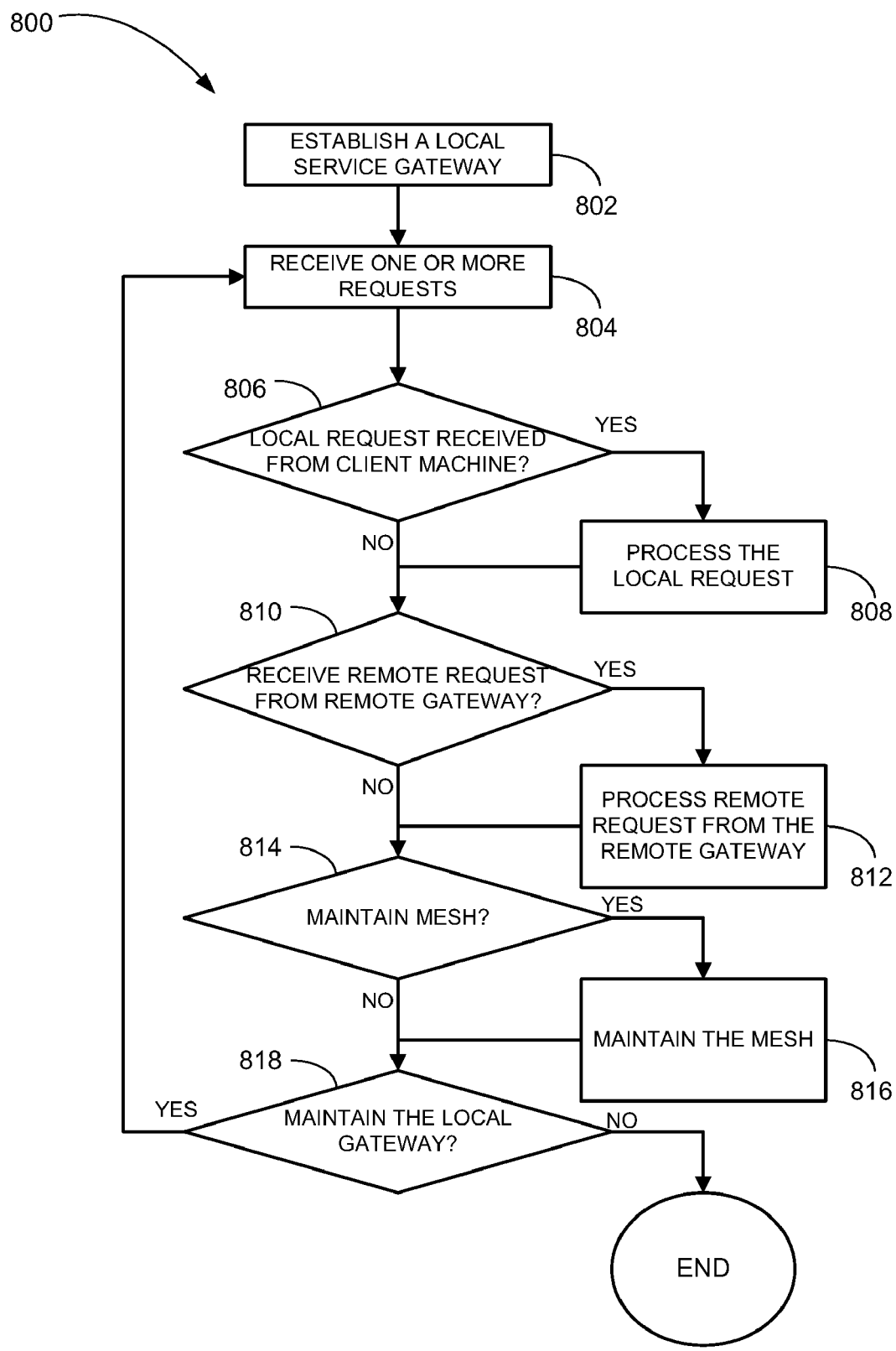
FIG. 8 is a flowchart illustrating a method for utilizing a service gateway according to an example embodiment.

Referring to FIG. 8, a method 800 for utilizing a service gateway 306, 402 (see FIGS. 3 and 4) according to an example embodiment is illustrated.

A local service gateway 306 may be established at block 802. The local service gateway 306 may be established so that it is available to other service gateways 402 available locally in a local data center 302.1 and/or over the network 304 to one or more remote data centers 302.2. An example embodiment of establishing the local service gateway 306 is described in greater detail below (see FIG. 3).

In an example embodiment, once the local service gateway 306 is established during the operations at block 802, the local service gateway 306 may be available on a mesh of interconnected service gateways 306 in a plurality of the data centers 302.

One or more requests may be received by the local service gateway 306 at block 804. For example, the requests may be from the client machines 312.1-312.3 within the local data center 302.1 (e.g., local requests) or from the client machines 312.4-312.n located within the remote data center 302.2 (e.g., remote requests). An example embodiment of processing the request is described in greater detail below.

A determination may be made at decision block 806 whether a local request has been received from the client machine 312. If a determination is made that a local request has been received from the client machine 312, the local request may be processed at block 808. If a determination is made at decision block 806 that a local request has not been received or upon completion of the operations at block 808, the method 800 may proceed to decision block 810.

At decision block 810, a determination may be made as to whether a remote request has been received from the remote service gateway 308. For example, the local service gateway 306 may be listening for other in-bound requests on the mesh. If a determination is made that a remote request has been received from the remote service gateway 308, the remote request may be processed at block 812. An example embodiment of processing the request is described in greater detail below. If a determination is made at decision block 810 that a remote request has not been received or upon completion of the operations at block 812, the method 800 may proceed to decision block 814.

A determination may be made at decision block 814 whether to perform mesh maintenance. For example, the mesh may be interconnection of a plurality of the service gateways 306, 308 and their respective connection with the service servers 310. If a determination is made to perform the mesh maintenance, the mesh may be maintained at block 816. An example embodiment of performing mesh maintenance is described in greater detail below. If a determination is made at decision block 814 not to perform mesh maintenance or upon completion of the operations at block 816, the method 800 may proceed to decision block 818.

At decision block 818, a determination may be made whether to maintain the local service gateway 306. If a determination is made to maintain the local service gateway 306, the method 800 may return to block 804. If a determination is made at decision block 818 not to maintain the local service gateway 306, the method 800 may terminate.

Figure 9:
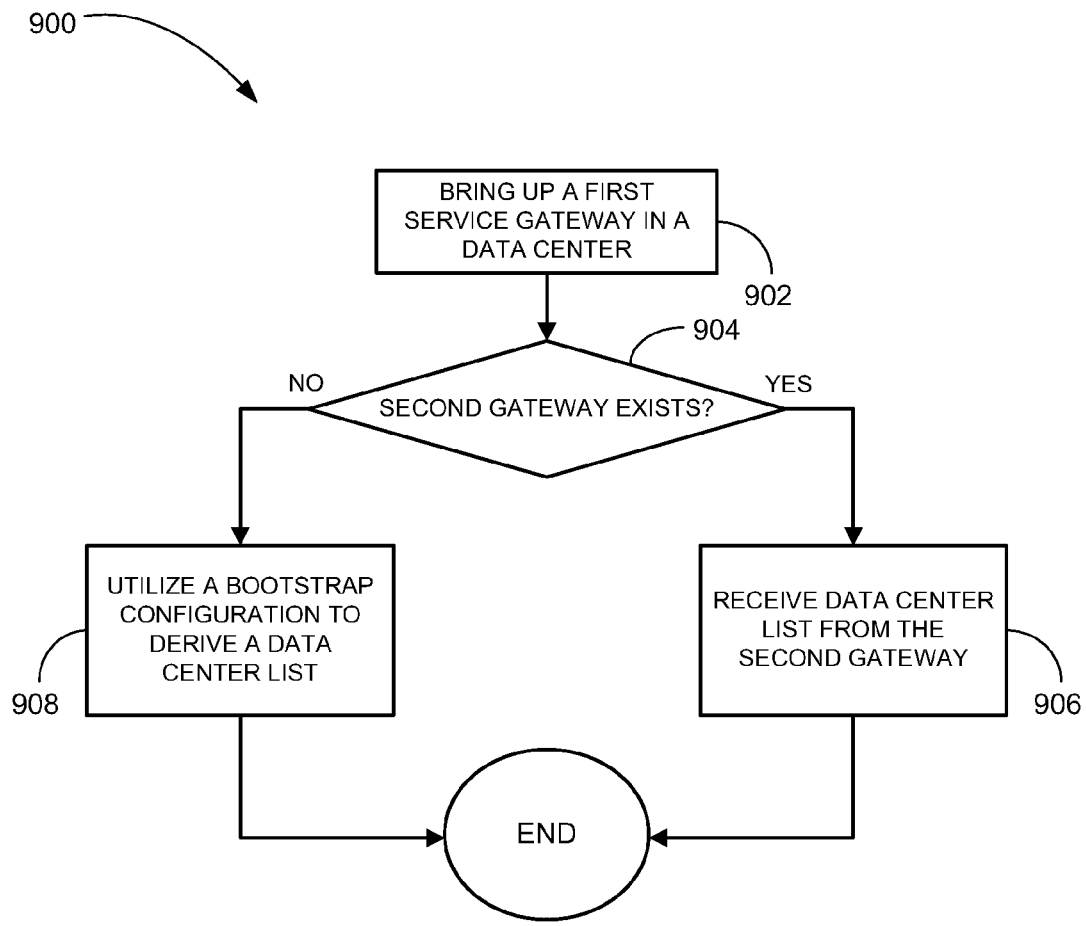
FIG. 9 is a flowchart illustrating a method for establishing a service gateway according to an example embodiment.

Referring to FIG. 9, a method 900 for establishing a service gateway 402 (see FIG. 4) according to an example embodiment is illustrated. In an example embodiment, the method 900 may be performed at block 802 (see FIG. 8).

A first service gateway 402 may be brought up in the data center 302.1 at block 902. In an example embodiment, the data center 302 may already include one or more additional service gateways 402.

A determination may be made at decision block 904 whether there is a second service gateway 402 in a same data center 302 (e.g., the local data center 302.1). For example, the service gateway 402 may broadcast within the local data center 302.1 to see if any other local service gateways 306 are available in the local data center 302.1. If a determination is made that there is a second service gateway 402 in the same data center 302, the data center list 414 may be received from the second service gateway 402 at block 906. If a determination is made at decision block 904 that a second service gateway 402 does not exist in the same data center 302, a bootstrap configuration may be used to derive the data center list 414 for the service gateway 402 at block 908. For example, the bootstrap configuration may be included in the DNS of the service gateway 402 to determine the data centers 302 to which the service gateway 402 is to communicate with and request a bootstrap list (e.g., a preconfigured list) of the service gateways 402 that are available in each of the data centers 302. Upon completion of the operations at block 906 or block 908, the method 900 may terminate.

Figure 10:
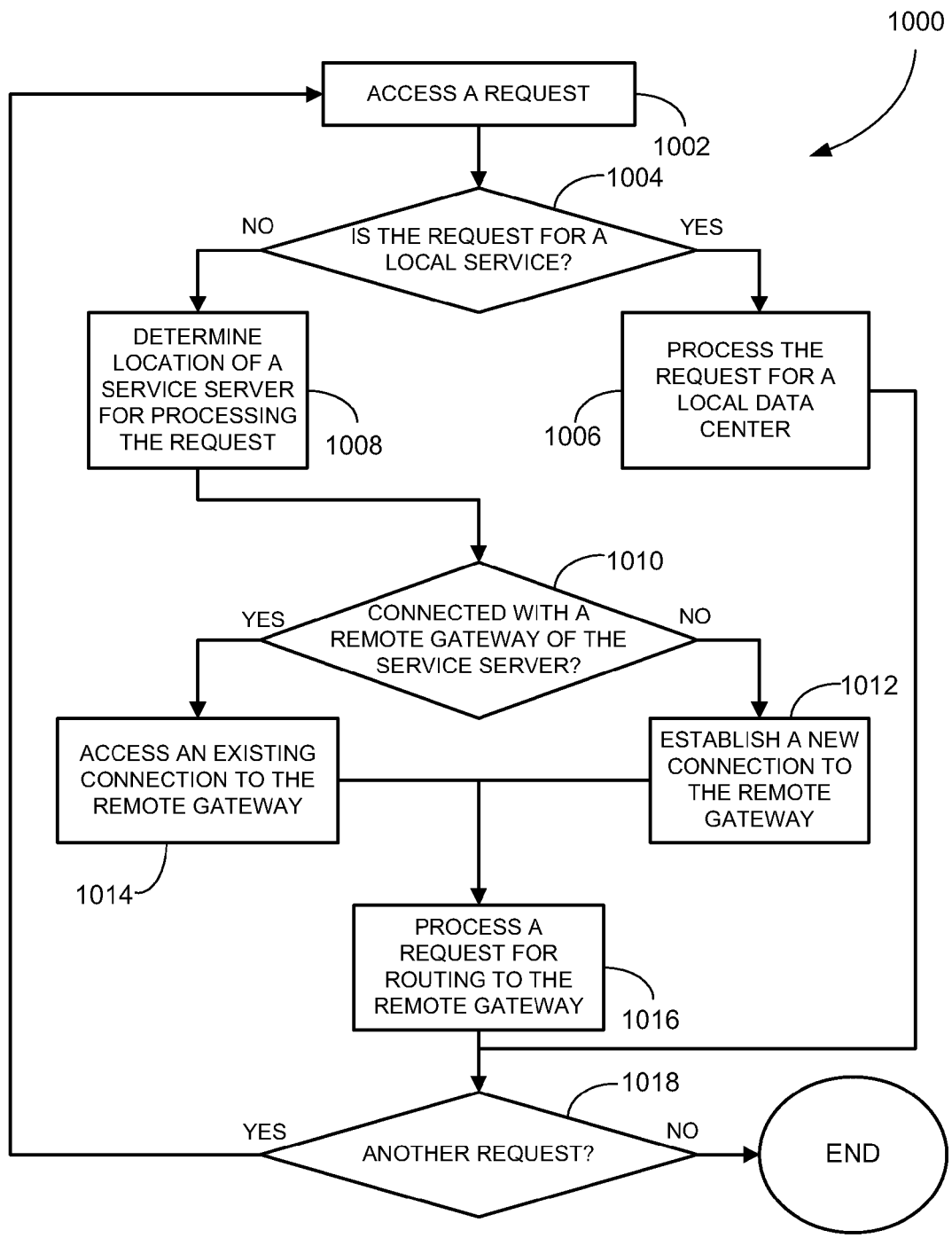
FIG. 10 is a flowchart illustrating a method for routing a request according to an example embodiment.

Referring to FIG. 10, a method 1000 for processing a request according to an example embodiment is illustrated. In an example embodiment, the method 1000 may be performed at block 808 (see FIG. 8) and/or by the local service gateway 306 (see FIG. 3) and/or the service gateway 402 (see FIG. 4).

A request may be accessed at block 1002. For example, a local request or a remote request may be received by the local service gateway 306 at block 1002.

A determination may be made at decision block 1004 as to whether the request is for a local service provided by the service server 310 in the local data center 302.1. If the request is for a local service, the request may be processed by the service server 310 in the local data center 302.1 at block 1006 and the method 1000 may proceed to decision block 1018. If a determination is made at decision block 1004 that the request is not for a local service (e.g., provided by a remote service server), a location of the service server 310 for processing the request may be determined at block 1008. For example, the service gateway 402 may use a configuration of services to determine a location on the mesh the in which the service (e.g., by a service server 310) is provided.

At decision block 1010, a determination may be made as to whether a local service gateway 306 making the request is connected with the remote service gateway 308 associated with the service server 310 to which the request may be directed. For example, the local service gateway 306 may be connected if the peer communications component 506 (see FIG. 5) already has a connection to the remote service gateway 308.

If a determination is made that the local service gateway 306 is not connected with the remote service gateway 308, a new connection to the remote service gateway 308 may be established at block 1012. For example, the peer communications component 506 may establish the connection to the remote service gateway 308. If a determination is made that the remote service gateway 308 is connected with the service server 310 at decision block 1010, an existing connection to the remote service gateway 308 may be accessed at block 1014.

Upon completion of the operations at block 1012 or block 1414, the request may be process for routing through the connection to the remote service gateway 308 at block 1016. For example, the request may be routed through the peer communications component 506 at block 1014 so that the request may be proxy to the remote location. The request may be routed over an optimized path from the local service gateway 306 to the remote service gateway 308 to reduce latency. An example embodiment of processing the request for routing to the remote service gateway 308 is described in greater detail below.

A determination may be made at decision block 1018 whether there is another request. If there is another request, the method 1000 may return to block 1002. If a determination is made that there is not another request at decision block 1018, method 1000 may terminate.

In an example embodiment, maintaining a persistent connection between the local service gateway 306 and the remote service gateway 308 may provide traffic optimization by enabling the client machine 312 to more quickly transmit a request and receive a response to the request from the service server 310.

In an example embodiment, the local service gateway 306 may selectively route the request when a trust level of a user of the client machine 312 meets or exceeds the trust level of the service server 310 for providing the service (e.g., as requested).

Figure 11:
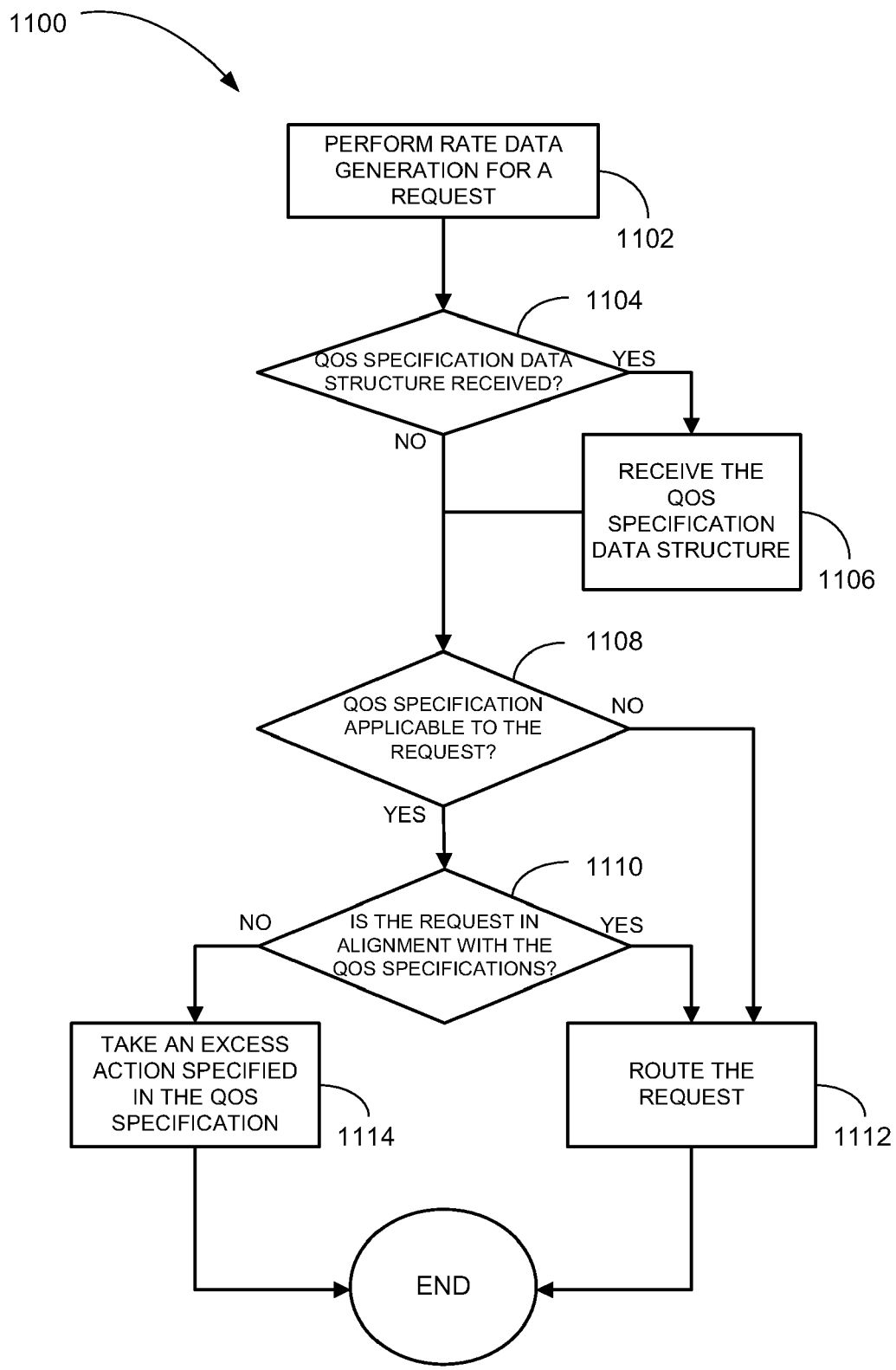
FIG. 11 is a flowchart illustrating a method for processing a request for routing according to an example embodiment.

Referring to FIG. 11, a method 1100 for processing a request for routing according to an example embodiment is illustrated. In an example embodiment, the method 1100 may be performed at block 1016 (see FIG. 10).

Rate data generation may be performed for a request at block 1102. An example embodiment for performing rate data generation is described in greater detail below.

A determination may be made at decision block 1104 whether QOS specification data structure 500 has been received. For example, one or more QOS specification data structures 500 of the QOS specification 416 may be provided by the rate evaluator 406 to the service gateway 402. If a determination is made that the QOS specification data structure 500 has been received, the QOS specification data structure 500 may be received at block 1106. If a determination is made at decision block 1104 that the QOS specification data structure 500 has not been received or upon completion of the operations at block 1106, the method 1100 may proceed to decision block 1108.

A determination may be made at decision block 1108 whether a QOS specification 416 available to the service gateway 402 (e.g., in memory of the service) is applicable to the request (e.g., the request on which the rate data generation request was performed at block 1102). For example, the request may be applicable when an identification of the request matching field 602 of the QOS specification data structure 600 matches the request and/or a current time matches the time of the time window field 606.

If a QOS specification 416 is applicable to the request, a determination may be made at decision block 1110 as to whether the request is in alignment with the QOS specifications 416 (e.g., to determine an action to be performed in accordance with the QOS specifications 416). For example, the request may be in alignment with the QOS specifications 416 when an identified rate is within the rate permitted by the rate identified in the permitted request rate field 604.

If a determination is made that the request is not in alignment with the quality of service specifications, an excess action specified in excess action field 608 may be performed at block 1114. For example, the request may be rejected, delayed, and/or sent to another location (e.g., another service gateway 402).

If a determination is made that the request is in alignment with the QOS specifications 416 at decision block 1110 or that the QOS specification 416 is not applicable to the request at decision block 1108, the request may be routed (e.g., in accordance with the QOS specification 416) to the remote service gateway 308 at block 1112. An example embodiment of routing the request is described in greater detail below. Upon completion of the operations at block 1112 or block 1114, the method 1100 may terminate.

In an example embodiment, the operations at block 1102 may be performed asynchronously from the operations performed after block 1102. For example, the service gateway 402 may perform after performing the operations at block 1102 may perform additional operations before performing the operations at decision block 1104.

In an example embodiment, routing the request in accordance with the QOS specifications 416 may mean that the QOS specifications 416 permits the routing of the request and the request should be routed.

Figure 12:
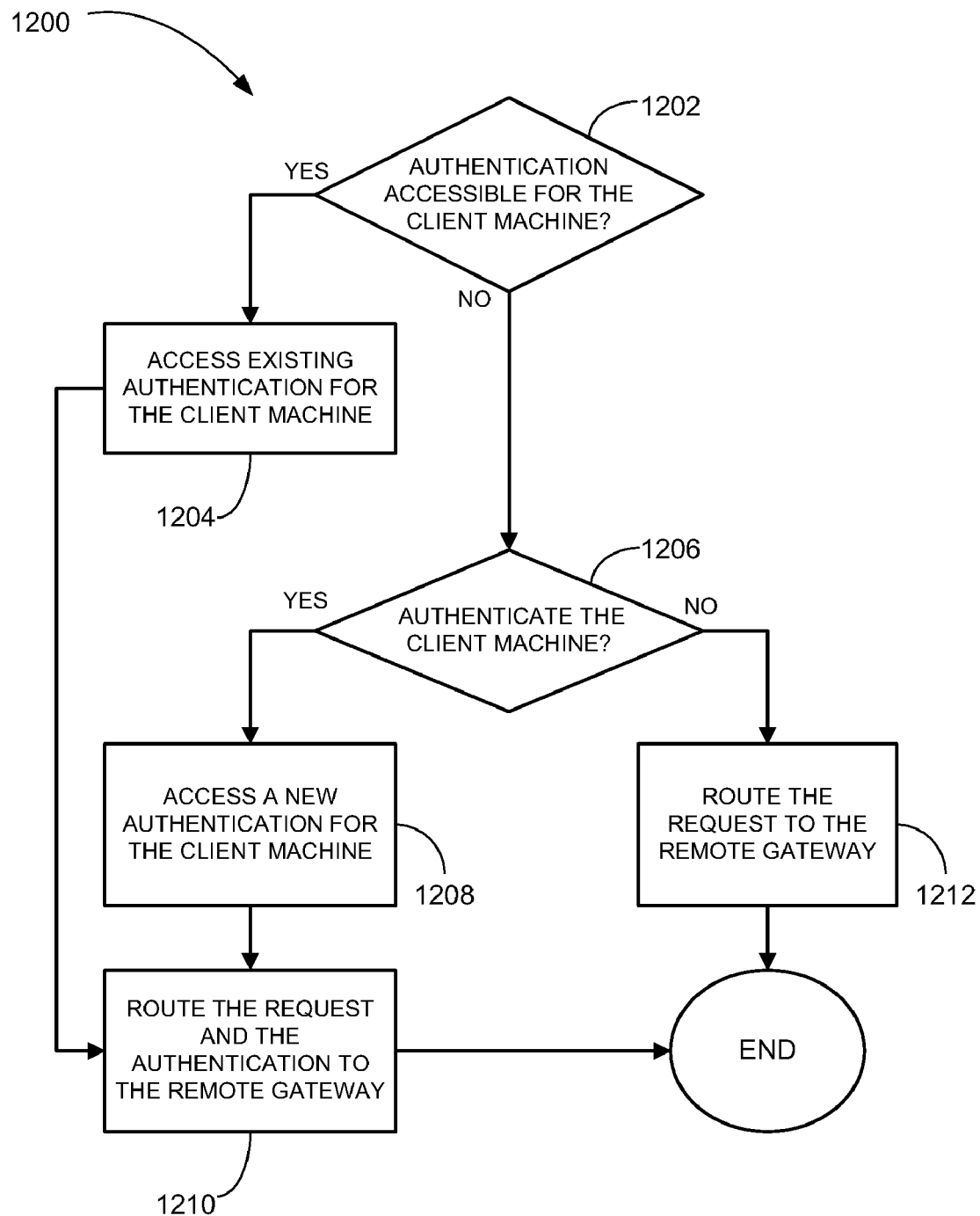
FIG. 12 is a flowchart illustrating a method for routing a request according to an example embodiment.

Referring to FIG. 12, a method for routing a request according to an example embodiment is illustrated. In an example embodiment, the method 1200 may be performed at block 1016 and/or block 1112 (see FIGS. 10 and 11).

A determination may be made at decision block 1202 whether an authentication is accessible (e.g., available) for the client machine 312 (e.g., whether the client machine 312 has been authenticated). If the authentication is accessible for the client machine 312, an existing authentication may be accessed for the client machine 312 at block 1204 and the method 1200 may proceed to block 1210. If an authentication is not available for the client machine 312 at decision block 1202, the method 1200 may proceed to decision block 1206.

A determination may be made at decision block 1206 whether to authenticate the client machine 312. If a determination is made to authenticate the client machine 312, a new authentication may be accessed for the client machine 312 at block 1208. For example, the client machine 312 may be authenticated and thereby receiving an authentication from the authentication service 404 of the local service gateway 306. Upon completion of the operations at block 1204 or block 1208, the request for the authentication may be routed to the remote service gateway 308 at block 1210.

If a client machine 312 is not authenticated at decision block 1206, the request may be routed to the remote service gateway at block 1212.

Upon completion of the operations at block 1210 or block 1212, the method 1200 may terminate.

In an example embodiment, providing the request (and optionally the authorization) from the local service gateway 306 over an optimized path to remote service gateway 308 at block 1210 or block 1212 may reduce the latency associated with interacting with a service of the service server 310 in the remote data center 302.2. The routing may optionally be a first level route to the remote service gateway 308 and a second level route to the service server 310. In an example embodiment, by authenticating the client machine 312 of the local data center 302.1 with the local service gateway 306 as opposed to the remote service gateway 308 or the service server 310 of the remote data center 302.2, the client machine 312 may be blocked locally if authentication fails before sending a request through the mesh as opposed to remotely thereby reducing traffic over the mesh.

Figure 13:
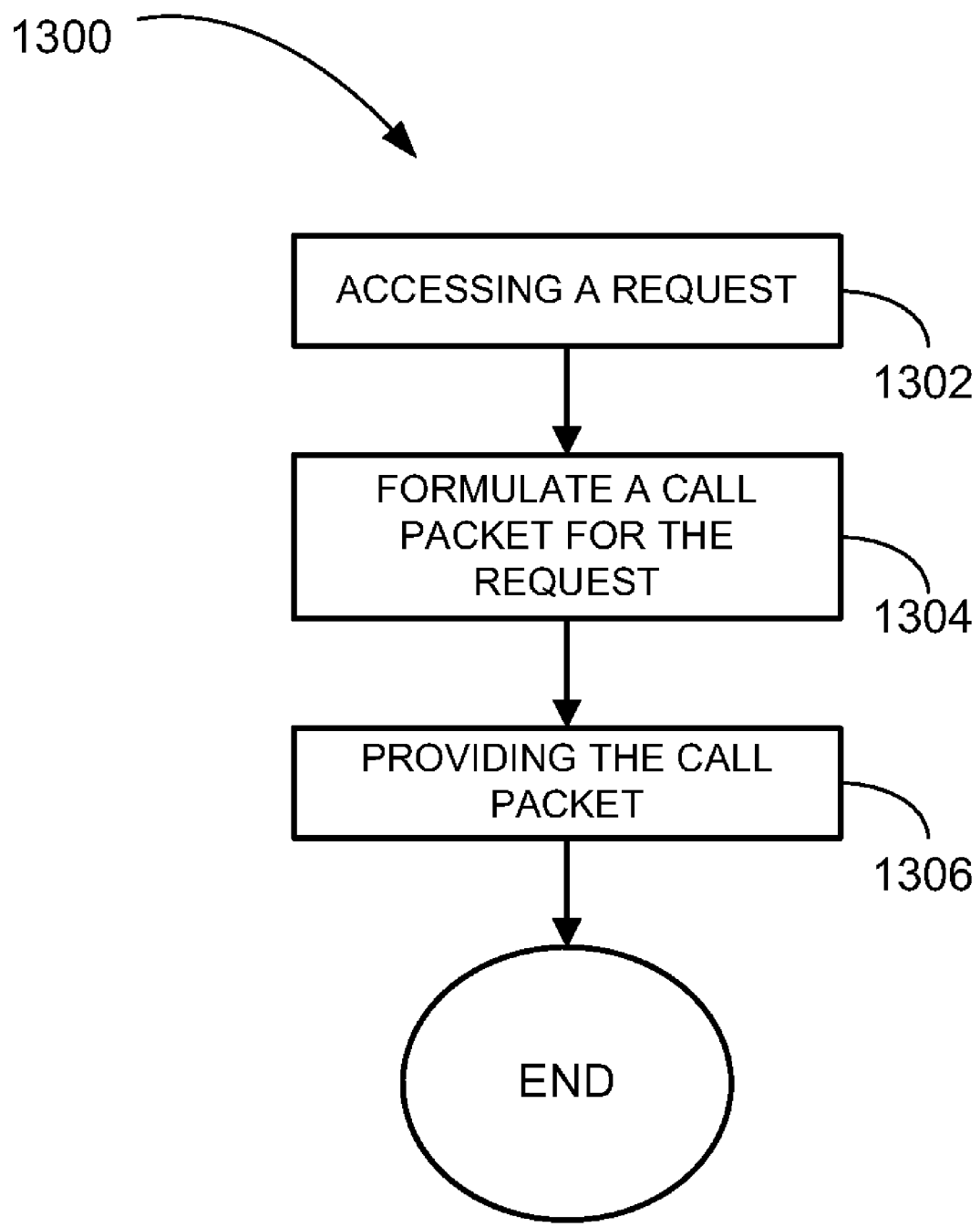
FIG. 13 is a flowchart illustrating a method for performing rate data generation according to an example embodiment.

Referring to FIG. 13, a method for performing rate data generation according to an example embodiment is illustrated. In an example embodiment, the method 1300 may be performed at block 1102 (see FIG. 11) and/or by the service gateway 402 (see FIG. 4).

A request may be accessed at block 1302. For example, the request may be received from the client machine 312 on the service gateway 402. A call packet 700 (see FIG. 7) may be formulated for the request at block 1304.

The call packet 700 may be provided at block 1306. For example, the call packet 700 may be provided asynchronously on a bus (e.g., a multi-cast bus) within the data center 302 and may be available to the rate evaluator 406. Upon completion of the operations at block 1306, the method 1300 may terminate.

Figure 14:
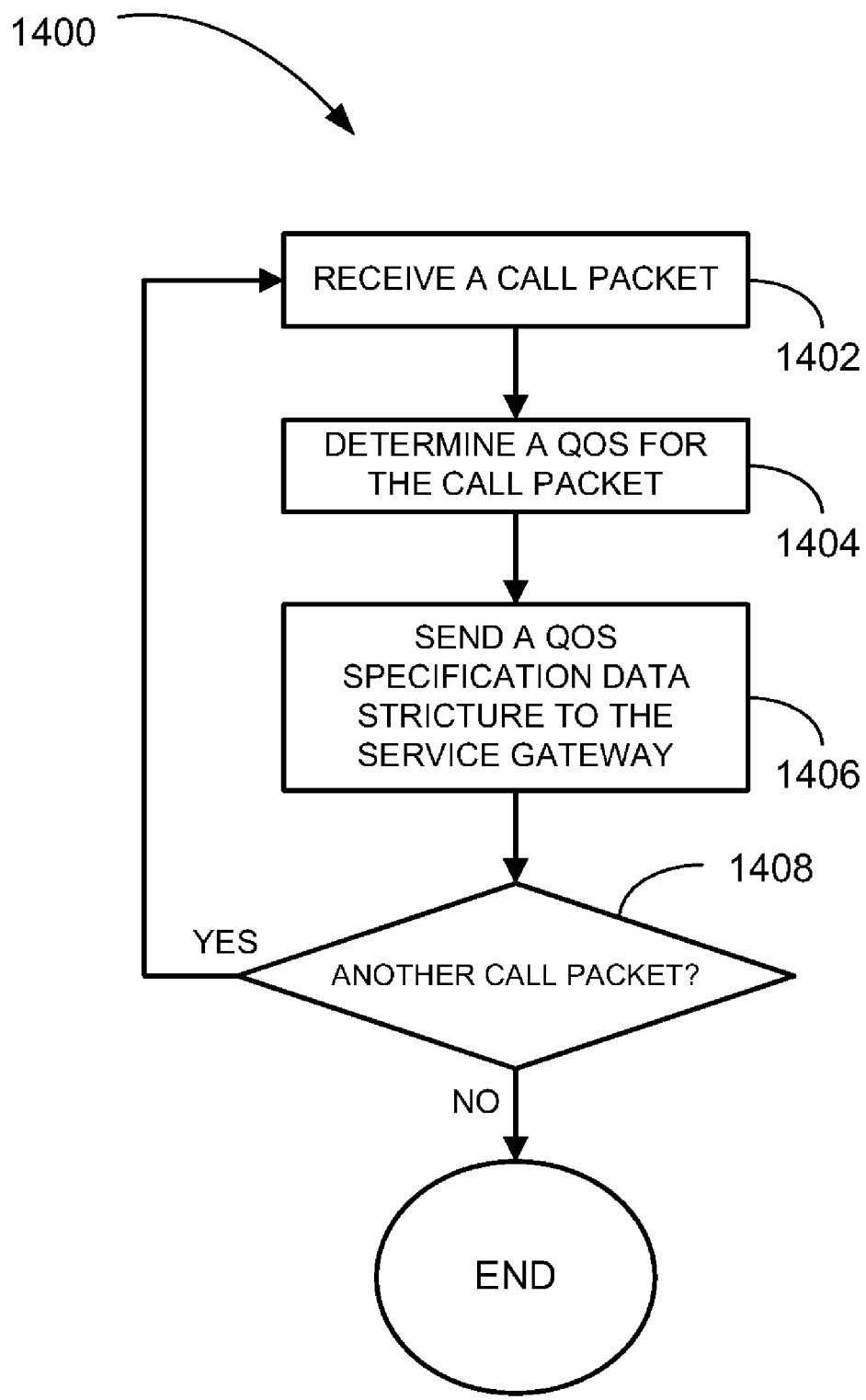
FIG. 14 is a flowchart illustrating a method for performing rate evaluation according to an example embodiment.

Referring to FIG. 14, a method for performing rate evaluation according to an example embodiment is illustrated. In an example embodiment, the method 1400 may be performed at block 1102 (see FIG. 11) and/or by the rate evaluator 406 (see FIG. 4).

A call packet 700 may be received at block 1402. For example, the call packet 700 may be received on a bus from the service gateway 402 and/or as may be provided at block 1306 (see FIG. 13).

A quality of service (QOS) may be determined for the call packet 700 at block 1404. For example, the rate evaluator 406 may apply the business policy 412 as applicable to the call packet 700 to determine the QOS of the call packet. For example, the business policy 412 may indicate that all call packets 700 received from a certain client machine 312 should have requests processed at a delay during a certain time window.

A QOS specification data structure 600 (see FIG. 6) may be sent to the service gateway 402 at block 1406.

A determination may be made at decision block 1408 as to whether another call packet 700 may be received. If a determination is made that another call packet 700 may be received, the method 1400 may return to block 1402. If a determination is made at decision block 1408 that another call packet 700 may not be received, the method 1400 may terminate.

In an example embodiment, the rate evaluator 406 may optionally be triggered asynchronously during operation of the method 1400.

Figure 15:
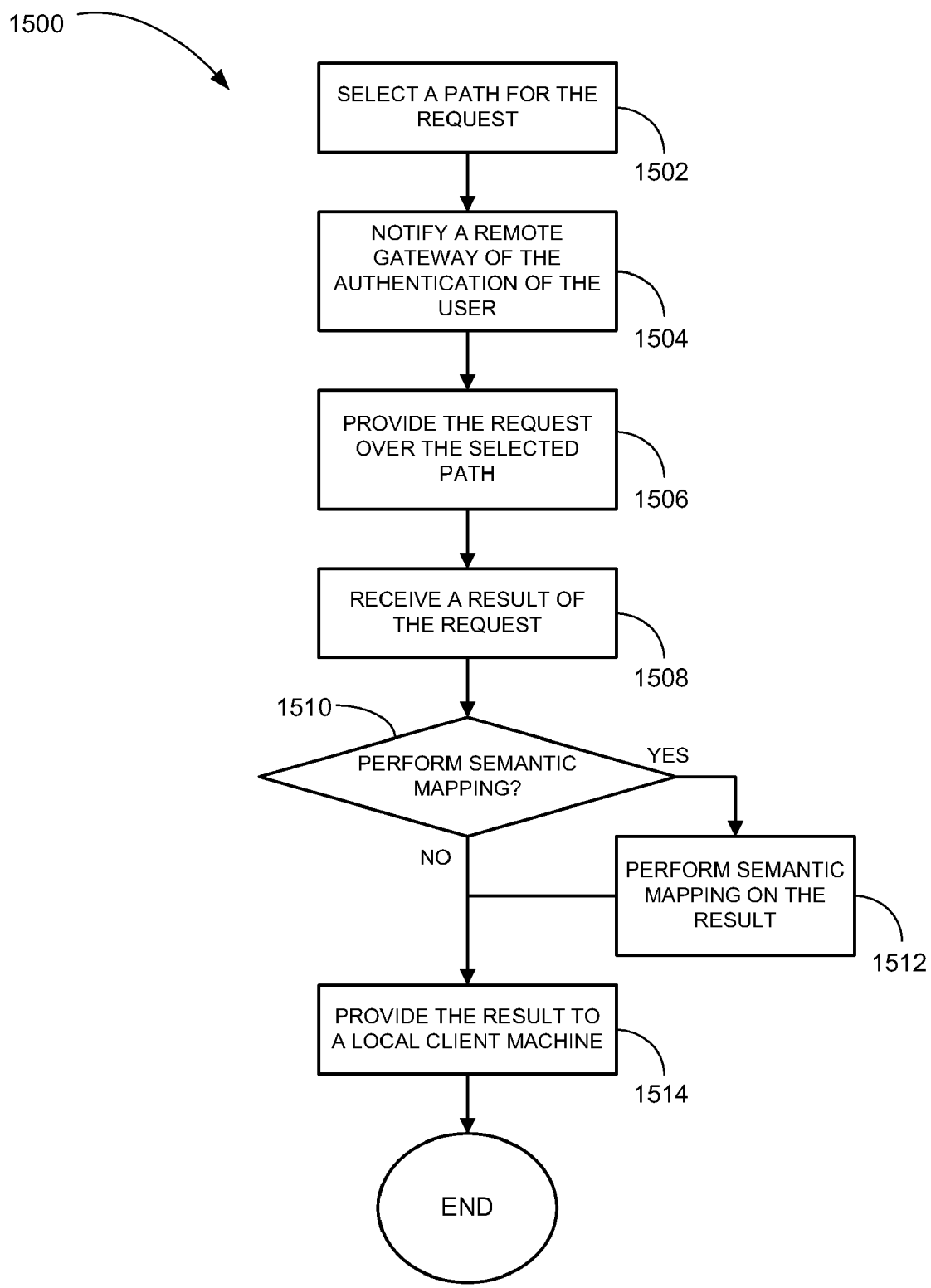
FIG. 15 is a flowchart illustrating a method for processing a request according to an example embodiment.

Referring to FIG. 15, a method 1500 for routing a request according to an example embodiment is illustrated. In an example embodiment, the method 1500 may be performed at block 1016, block 1112, and/or block 1210 (see FIG. 12) and/or by the service gateway 402 (see FIG. 4).

A path (e.g., from the local service gateway 306 to the remote service gateway 308) may be selected for the request at block 1502. The remote service gateway 308 may be notified of an authentication (e.g., as may be accessed at block 1204 or block 1208) at block 1504.

The request may be provided over the selected path at block 1506. For example, the request may be multiplexed over the selected path to enable sending of multiple requests between the local service gateway 306 and the remote service gateway 308. The request may be sent in one or more data packets, with each data packet wrapped with addressing information so that the service server 310 receiving the request from the remote service gateway knows how to invoke an application (e.g., a service) of the service server 310. For example, the request and/or the results of the request may be broken into data packets that are not larger than the maximum size for multiplexing and may be sequenced with an envelope including typing correlation, and/or packet assembly instructions.

A result of the request may be received from the remote service gateway 308 at block 1508. The result may optionally be sent as a data packet wrapped in an envelope that instructs the local service gateway 306 on the destination from among the client machines 312.1-312.3 that the data packet was destined.

A determination may be made at decision block 1510 whether to perform semantic mapping. For example, semantic mapping may include translating a request (or a response to a request) from a first protocol (e.g., HTTP) into a second protocol (e.g., a stream). If a determination is made to perform semantic mapping, semantic mapping may be performed on the result of the request at block 1512. If a determination is made at decision block 1510 not to perform semantic mapping or upon completion of the operations at block 1512, the result (e.g., the result or a semantically mapped result) may be provided to the client machine 312 that made the request at block 1514. Upon completion of the operations at block 1514, the method 1500 may terminate.

Figure 16:
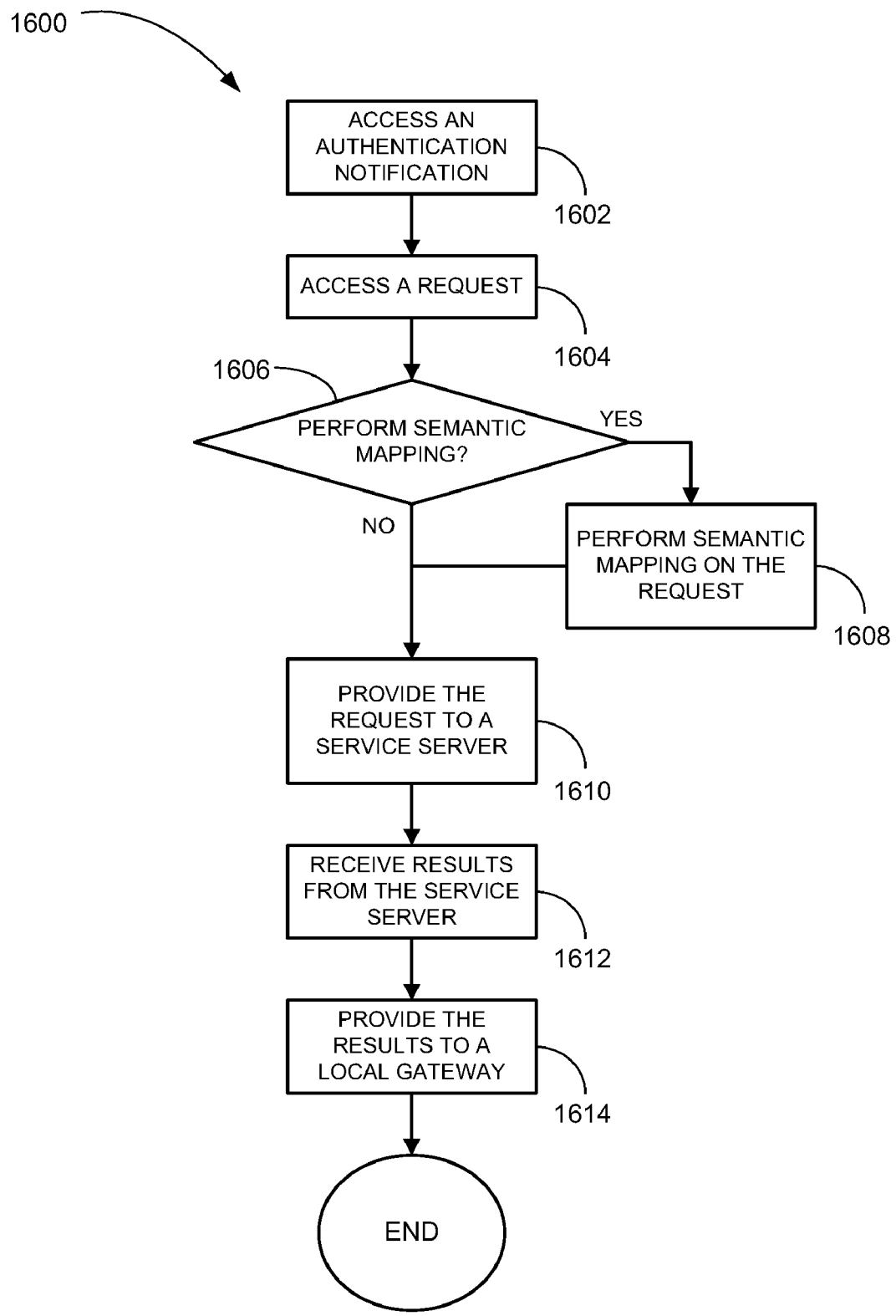
FIG. 16 is a flowchart illustrating a method for processing a remote request received from a remote service gateway according to an example embodiment.

Referring to FIG. 16, a method 1600 for processing a remote request received from the remote service gateway 308 (see FIG. 3) according to an example embodiment is illustrated. In an example embodiment, the method 1600 may be performed at block 812 (see FIG. 8) and/or by the local service gateway 306 and/or the service gateway 402 (see FIG. 4).

An authentication notification may be received at block 1602. For example, the authentication notification may be provided by the remote service gateway as a result of the operations performed at block 1104 (see FIG. 11).

A request may be accessed at block 1604. For example, the request may be accessed through the peer communications component 506 of the remote service gateway 308. In an example embodiment, the request may look like a local request to the remote service gateway 308 at block 1604 when received through the peer communications component 506 (see FIG. 5).

A determination may be made at decision block 1606 whether to perform semantic mapping. If a determination is made to perform semantic mapping, semantic mapping may be performed on the request at block 1608. If a determination is made at decision block 1606 not to perform semantic mapping or upon completion of the operations at block 1608, the method 1600 may proceed to block 1610.

The request may be provided from the remote service gateway 308 to the service server 310 at block 1610. For example, the service handling component 504 of the remote service gateway 308 may call an application (e.g., a service) on the service server 310 with the received request.

Results may be received by the remote service gateway 308 from the service server 310 at block 1612. For example, the service handling component 504 may receive results from the application running on the service server 310.

The results may be provided from the remote service gateway 308 to the local service gateway 306 at block 1614. For example, the service handling component 504 may provide the results to the peer communications component 506 for transmission through the network 104 (see FIG. 1).

Upon completion of the operations at block 1614, the method 1600 may terminate.

Figure 17:
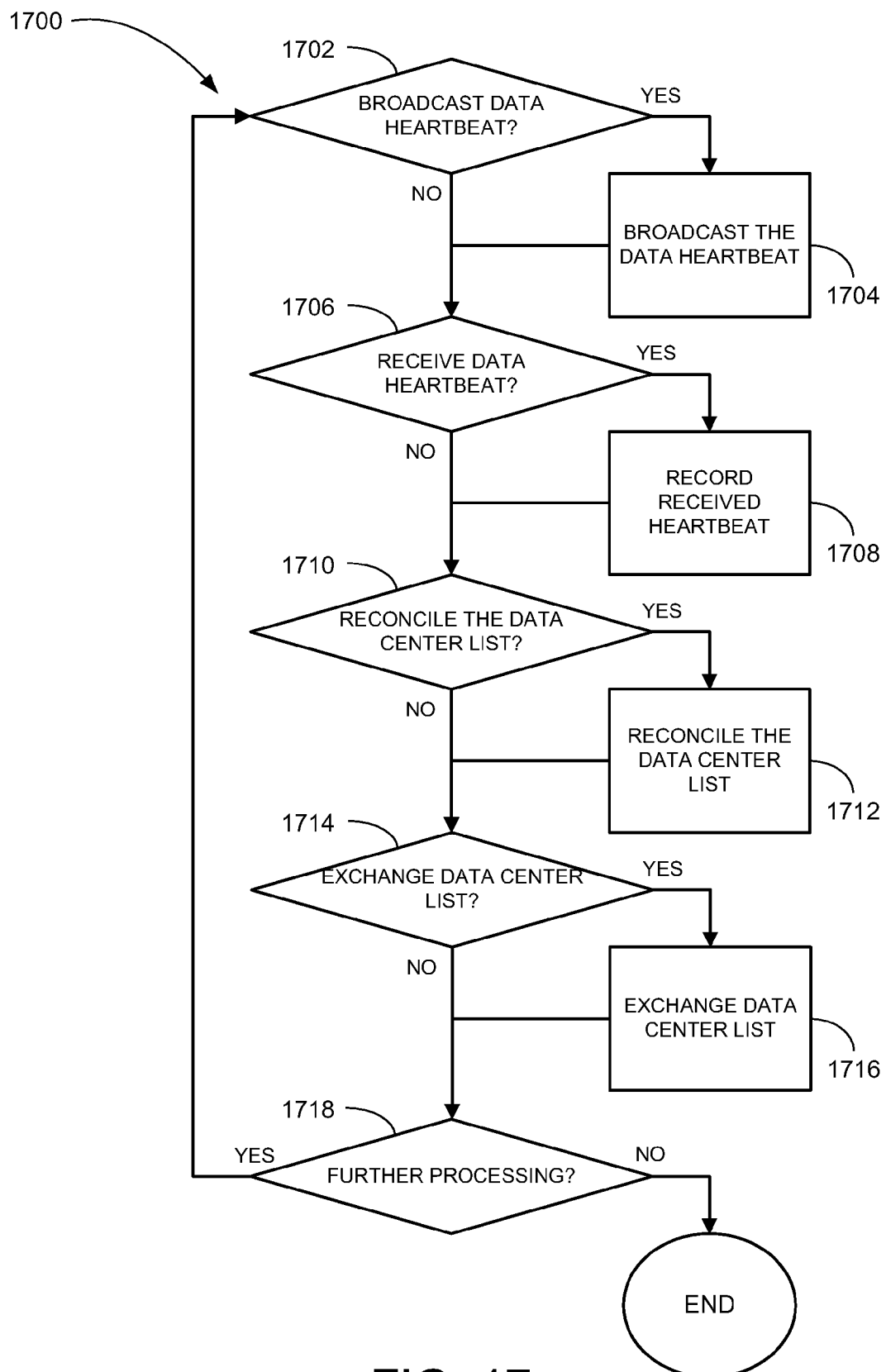
FIG. 17 is a flowchart illustrating a method for maintaining a mesh according to an example embodiment.

Referring to FIG. 17, the method 1700 for maintaining the mesh according to an example embodiment is illustrated. In an example embodiment, the method 1700 may be performed at block 816 (see FIG. 8) and/or by the service gateway 402 (see FIG. 4).

A determination may be made at decision block 1702 whether to broadcast a data heartbeat. The data heartbeat notifies other service gateways 402 within the data center 302 that a particular service gateway 402 is still online (e.g. on the mesh and/or online) and may be made at predetermined and/or random times. If a determination is made to broadcast the data heartbeat, the data heartbeat may be broadcast (e.g., a remaining number of the service gateways 402 within the data center 302) at block 1704. If a determination is made at decision block 1702 not to broadcast the data heartbeat or upon completion of the operations at block 1704, the method 1700 may proceed to decision block 1706.

At decision block 1706, a determination may be made whether a data heartbeat has been received from another service gateway 402 in the data center 302. If a determination has been made that a data heartbeat has been received, the receipt of the data heartbeat from a particular service gateway 402 may be recorded on the data center list 414 at block 1708. If a determination is made that a data heartbeat has not been received at decision block 1706 or upon completion of the operations of block 1708, the method 1700 may proceed to decision block 1710.

A determination may be made at decision block 1710 whether to reconcile the data center list 414. Reconciling the data center list 414 may remove one or more service gateways 402 from the data center list 414. If a determination is made to reconcile the data center list 414, the data center list 414 may be reconciled at block 1712. For example, reconciling the data center list 414 may include removing a selected service gateway 402 from among the service gateways 402 on the data center list 414 when the data heartbeat is not received from the selected service gateway during a time period. An example embodiment of reconciling the data center list 414 is described in greater detail below. If a determination is made not to reconcile the data center list 414 at decision block 1710 or upon completion of the operations at block 1712, method 1700 may proceed to decision block 1714.

A determination may be made at decision block 1714 whether to exchange the data center list 414 with another service gateway 402. If a determination is made to exchange the data center list 414, the data center lists 414 may be exchanged between the service gateways 402 at block 1716. If a determination is made not to exchange the data center list 414 at decision block 1714 or upon completion of the operations at block 1716, the method 1700 may proceed to decision block 1718.

At decision block 1718, a determination may be made whether to proceed with further processing. If a determination is made to proceed with further processing, the method 1700 may return to decision block 1702. If a determination is made at decision block 1714 not to proceed with further processing, the method 1700 may terminate.

In an example embodiment, the data center list 414 exchanged between two service gateways 402 may only include providing a single data center list 414 from a first service gateway 402 to a second service gateway 402.

Figure 18:
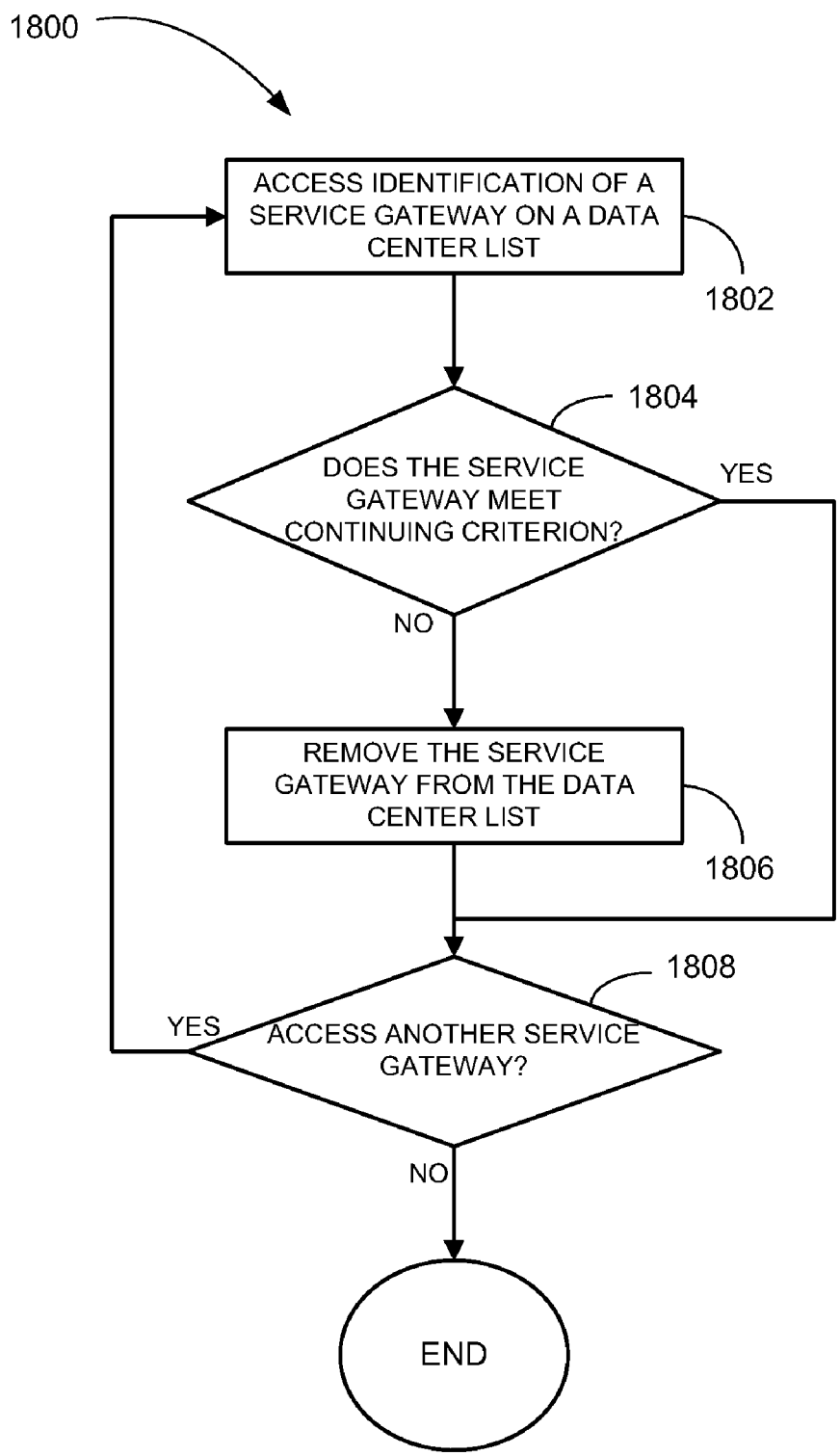
FIG. 18 is a flowchart illustrating a method for reconciling the data center list according to an example embodiment.

Referring to FIG. 18, a method 1800 for reconciling the data center list 414 (see FIG. 4) according to an example embodiment is illustrated. In an example embodiment, the method 1800 may be performed at block 1712 (see FIG. 17).

Identification of a service gateway 402 (see FIG. 4) on the data center list 414 may be accessed at block 1802. The identification identifies another service gateway 402 located in the mesh.

At decision block 1804, a determination may be made as to whether the service gateway 402 meets a continuing criterion. For example, the continuing criterion may be an amount of time (e.g., three minutes) that if a data heartbeat is not received from the service gateway 402 that it may be removed from the data center list 414 as being currently unavailable. If a determination is made that the service gateway 402 does not meet the continuing criterion, the service gateway 402 may be removed from the data center list 414 at block 1806. If a determination is made that the service gateway 402 meets the continuing criterion at decision block 1804 or upon completion of the operations at block 1806, the method 1800 may proceed to decision block 1808.

At decision block 1808, a determination may be made whether to access another service gateway 402 from the data center list 414. If a determination is made to access another service gateway 402, the method 1800 may return to block 1802. If a determination is made not to access another service gateway 402 at decision block 1808, the method 1800 may terminate.

Figure 19:
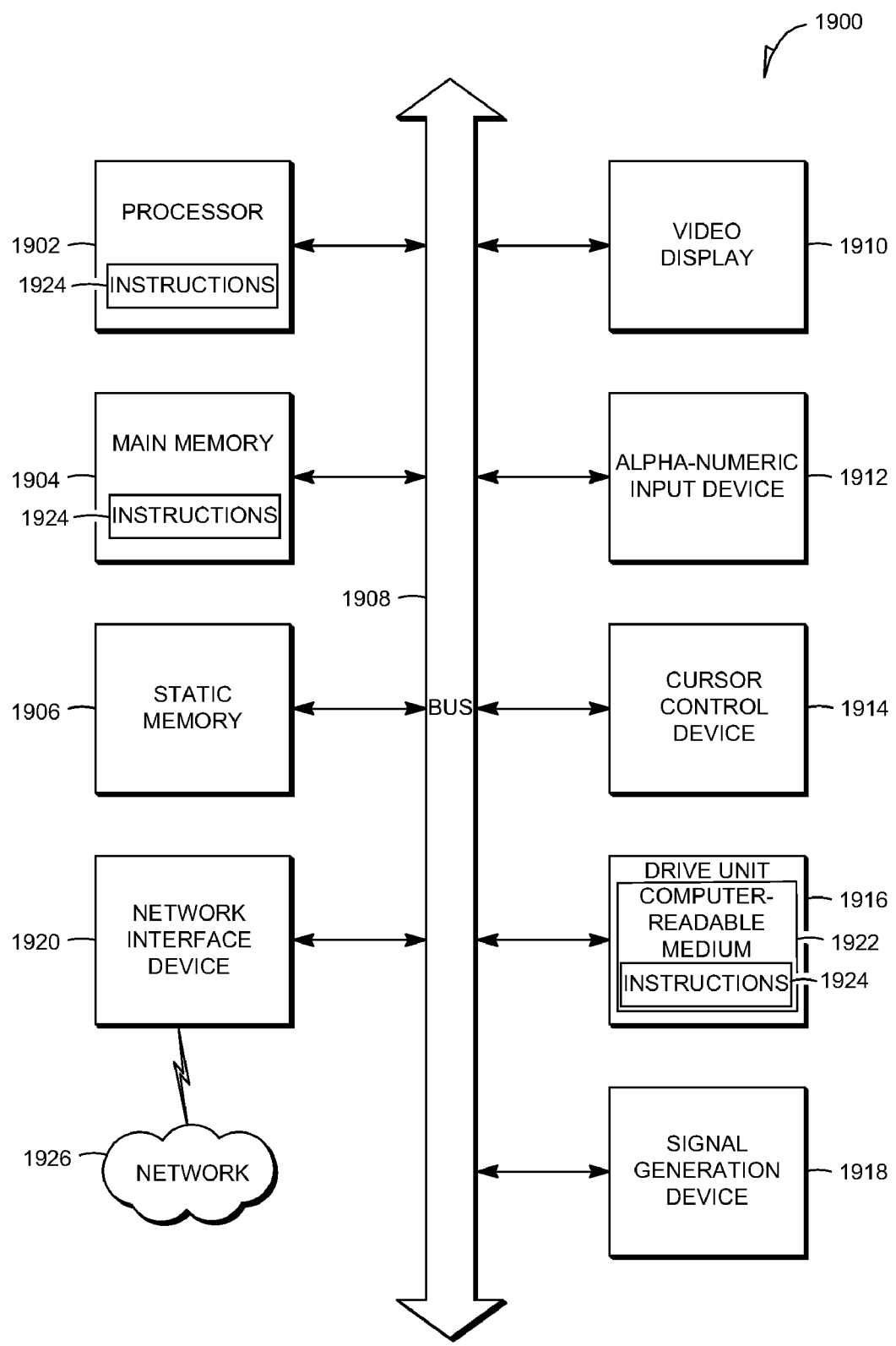
FIG. 19 is a block diagram diagrammatic representation of machine in the example form of a computer system within which a set of instructions, for causing the machine to perform any one or more of the methodologies discussed herein, may be executed.

FIG. 19 shows a diagrammatic representation of machine in the example form of a computer system 1900 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU) a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a mouse), a drive unit 1916, a signal generation device 1918 (e.g., a speaker) and a network interface device 1920.

The drive unit 1916 includes a machine-readable medium 1922 on which is stored one or more sets of instructions (e.g., software 1924) embodying any one or more of the methodologies or functions described herein. The software 1924 may also reside, completely or at least partially, within the main memory 1904 and/or within the processor 1902 during execution thereof by the computer system 1900, the main memory 1904 and the processor 1902 also constituting machine-readable media.

The software 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for gateway communication have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing a request for an application on a first service gateway;
    determining a location of a service server providing the application;
    accessing a connection to a second service gateway in communication with the service server, the second service gateway not in a same data center as the first service gateway;
    determining whether the request is in alignment with a quality of service (QOS) specification received by the first service gateway, the QOS specification comprising one or more QOS specification data structures, each QOS specification data structure having a request matching field that identifies requests subject to the QOS specification data structure, a time window field providing a time when the QOS specification data structure is to be applied, a permitted request rate field providing a particular rate at which an application is to be accessed, and an excess action field providing an excess action to be taken by the first service gateway when the request matches the request matching field and exceeds the particular rate during the time indicated by the time window field; and
    performing an action with the request in accordance with the QOS specification.

2. The method of claim 1, wherein accessing a connection to a second service gateway comprises:
    accessing an existing connection to a second service gateway.

3. The method of claim 1, wherein accessing a connection to a second service gateway comprises:
    establishing a new connection with a second service gateway.

4. The method of claim 1, wherein performing an action with the request in accordance with the QOS specification comprises:

routing the request from the first service gateway to the second service gateway when the request is in alignment with the QOS specification.

5. The method of claim 1, wherein performing an action with the request in accordance with the QOS specification comprises:

performing the excess action when the request is not in alignment with the QOS specification.

6. The method of claim 5, wherein the excess action comprises processing the request.

7. The method of claim 1, wherein routing the request comprises:

accessing an authentication for a client machine; and
routing the request and the authentication from the first service gateway to the second service gateway.

8. The method of claim 1, further comprising:

receiving a result from the second service gateway, the result from the second service gateway in response to the second service gateway having received the request; and
providing the results from the first service gateway to a local client machine.

9. The method of claim 1, further comprising:

receiving a result from the second service gateway, the result from the second service in response to the second service gateway having received the request;
performing semantic mapping on the result; and
providing the semantically mapped results from the first service gateway to a local client machine.

10. A non-transitory machine-readable storage medium comprising instructions, which when executed by a machine, cause the machine to perform a method comprising:

accessing a request for an application on a first service gateway;
determining a location of a service server providing the application;
accessing a connection to a second service gateway in communication with the service server, the second service gateway not in a same data center as the first service gateway;
determining whether the request is in alignment with a quality of service (QOS) specification received by the first service gateway, the QOS specification comprising one or more QOS specification data structures, each QOS specification data structure having a request matching field that identifies requests subject to the QOS specification data structure, a time window field providing a time when the QOS specification data structure is to be applied, a permitted request rate field providing a particular rate at which an application is to be accessed, and an excess action field providing an excess action to be taken by the first service gateway when the request matches the request matching field and exceeds the particular rate during the time indicated by the time window field; and
performing an action with the request in accordance with the QOS specification.

11. The non-transitory machine-readable storage medium of claim 10, wherein the method further comprises performing the excess action when the request is not in alignment with the QOS specification.

12. The method of claim 5, wherein the excess action comprises rejecting the request.

13. The method of claim 5, wherein the excess action comprises delaying routing of the request.

14. The method of claim 5, wherein the excess action comprises sending the request to a third service gateway.

* * * * *